United States Patent
Cho

(10) Patent No.: US 8,912,768 B1
(45) Date of Patent: Dec. 16, 2014

(54) SOFT-SWITCHED VOLTAGE CLAMP TAPPED-INDUCTOR STEP-UP BOOST CONVERTER

(71) Applicant: Inter. M Corporation, Yangju-si (KR)

(72) Inventor: Soon Koo Cho, Yangju-si (KR)

(73) Assignee: Inter. M Corporation, Gyeonggi-Do (KR)

( * ) Notice: Subject to any disclaimer, the term of this patent is extended or adjusted under 35 U.S.C. 154(b) by 0 days.

(21) Appl. No.: 14/223,798

(22) Filed: Mar. 24, 2014

(30) Foreign Application Priority Data

Jun. 27, 2013 (KR) .................. 10-2013-0074203

(51) Int. Cl.
*G05F 1/10* (2006.01)
*H02M 3/156* (2006.01)

(52) U.S. Cl.
CPC .................................. *H02M 3/156* (2013.01)
USPC .......................................... 323/222; 323/223

(58) Field of Classification Search
CPC . H02M 1/4225; H02M 1/4241; H02M 3/155; H02M 3/156; H02M 3/1582
USPC ......... 323/222, 224, 225, 247, 255, 282, 285; 315/219, 223, 247
See application file for complete search history.

(56) References Cited

U.S. PATENT DOCUMENTS

| | | | |
|---|---|---|---|
| 6,525,513 B1* | 2/2003 | Zhao | 323/222 |
| 7,023,186 B2* | 4/2006 | Yan | 323/225 |
| 7,161,331 B2* | 1/2007 | Wai et al. | 323/222 |
| 7,382,113 B2* | 6/2008 | Wai et al. | 323/222 |
| 2012/0063172 A1 | 3/2012 | Kim | |

FOREIGN PATENT DOCUMENTS

| | | |
|---|---|---|
| KR | 10-2010-0082084 A | 7/2010 |
| KR | 10-2011-0056421 A | 5/2011 |
| KR | 10-2012-0028091 A | 3/2012 |
| KR | 10-2012-0054991 A | 5/2012 |

OTHER PUBLICATIONS

Hsieh et al., "A Novel High Step-Up DC-DC Converter for a Microgrid System," *IEEE Translations on Power Electronics*, vol. 26, No. 4, (2011).
From Corresponding Korean Patent Application 10-2013-0074203, Office Action dated Aug. 19, 2013 and its English translation provided by Applicant's foreign associates.

* cited by examiner

*Primary Examiner* — Adolf Berhane
*Assistant Examiner* — Jye-June Lee
(74) *Attorney, Agent, or Firm* — Ladas & Parry, LLP

(57) ABSTRACT

An apparatus provides a soft-switched voltage clamp tapped-inductor step-up boost converter that is capable of reducing voltage stress on a switch and a diode of the boost converter without using a dissipative snubber and that is capable of reducing a switching loss while maintaining a high input-to-output boost ratio.

6 Claims, 20 Drawing Sheets

SOFT-SWITCHED VOLTAGE CLAMP TAPPED-INDUCTOR STEP-UP BOOST CONVERTER

RELATED APPLICATIONS

This application claims the benefit of Korean Patent Application No. 10-2013-0074203, filed on Jun. 27, 2013, which is hereby incorporated by reference as if fully set forth herein.

FIELD OF THE INVENTION

The invention relates to a voltage clamp step-up boost converter, and more specifically, to a voltage clamp step-up boost converter that removes the configuration of a dissipative snubber using a resonant clamp capacitor.

This work was supported by the MSIP (Ministry of Science, ICT and Future Planning) and NIPA (National IT Industry Promotion Agency) in Korea under Project 2013-H0301-13-2007 [Technology Research for Energy-IT Convergence].

BACKGROUND OF THE INVENTION

Recently, various power supply units used to boost a low DC voltage are being developed for electronic devices based on a fuel cell or battery. In particular, a boost converter using a tapped inductor is launched in the market in order to satisfy a high boost ratio, high power conversion efficiency, and low manufacturing cost.

The boost converter using the tapped inductor is manufactured by adding the tapped inductor serving as a transformer to the boost converter. In connection with the boost converter using the tapped inductor, Korean Patent Publication No. 2010-0082084 A (laid-open published on Jul. 16, 2010) discloses a method of embodying a zero-voltage turn-on and zero-current turn-off function by using a tapped inductor of the boost converter.

In the boost converter using tapped inductor, it is possible to obtain a high boost ratio, but an inductor and a capacitor of a switch causes an occurrence of resonance when the switch is turned off. As a result, a surge voltage is generated across the switch, which incurs an excessive stress on the switch. Hence, the boost converter using tapped inductor needs to use a high withstand voltage diode and a dissipative snubber.

SUMMARY OF THE INVENTION

In view of the above, the present invention provides a voltage clamp step-up boost converter that is capable of reducing voltage stress on a switch and a diode of the boost converter without using a dissipative snubber and that is capable of reducing a switching loss while maintaining a high input-to-output boost ratio. However, the technical subject of the embodiment of the present invention is not limited to the foregoing technical subject, and there may be other technical subjects.

In accordance with an aspect of the embodiment, there is provided an apparatus for a voltage clamp step-up boost converter comprising: a leakage inductor having a first end connected to a power supply unit; a tapped inductor having a first end connected to a second end of the leakage inductor; a magnetizing inductor having a first end connected to the second end of the leakage inductor and a second end connected to a second end of the tapped inductor; a switch having a first end connected to the second end of the tapped inductor and a second end connected to a second end of the power supply unit; a first diode having a first end connected to the second end of the tapped inductor; a second diode having a first end connected to a second end of the first diode and a second end connected to a third end of the tapped inductor; a resonant clamp capacitor having a second end connected between the second end of the first diode and the first end of the second diode and a first end connected between the first end of the power supply unit and the first end of the leakage inductor, the resonant clamp capacitor being configured to perform the clamping of the voltage across the switch and zero-voltage switching thereof when the switch is turned-off; an output capacitor having a first end connected to the second end of the second diode and a second end connected to the second end of the switch; an output load resistor having a first end connected to the first end of the second end of the output capacitor and a second end connected to the output capacitor; and a blocking capacitor having a first end connected to the third end of the tapped inductor and a second end connected to the second end of the second diode, wherein when the switch is turned-on, the voltage clamp step-up boost converter is configured to form a conductive path through the power supply unit, the resonant clamp capacitor, the blocking capacitor, the tapped inductor, and the switch and cause resonance through the resonant clamp capacitor and the leakage inductor with each other to decrease the voltage applied to the resonant clamp capacitor to a negative (−) voltage, thereby making the switch to be zero-current turned-on; and wherein when the switch is turned-off, the voltage clamp step-up boost converter is configured to form a conductive path through the leakage inductor, the tapped inductor, the first diode, and the resonant clamp capacitor to increase the voltage applied to the resonant clamp capacitor to a positive (+) voltage, thereby making the switch to be zero-voltage turned-off.

In accordance with any one of solutions to the aforementioned subject of the present invention, it is possible to reduce the voltage stress on a switch and a diode of the boost converter without using a dissipative snubber and to reduce a switching loss while maintaining a high input-output boost ratio.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE INVENTION

Figure 1:
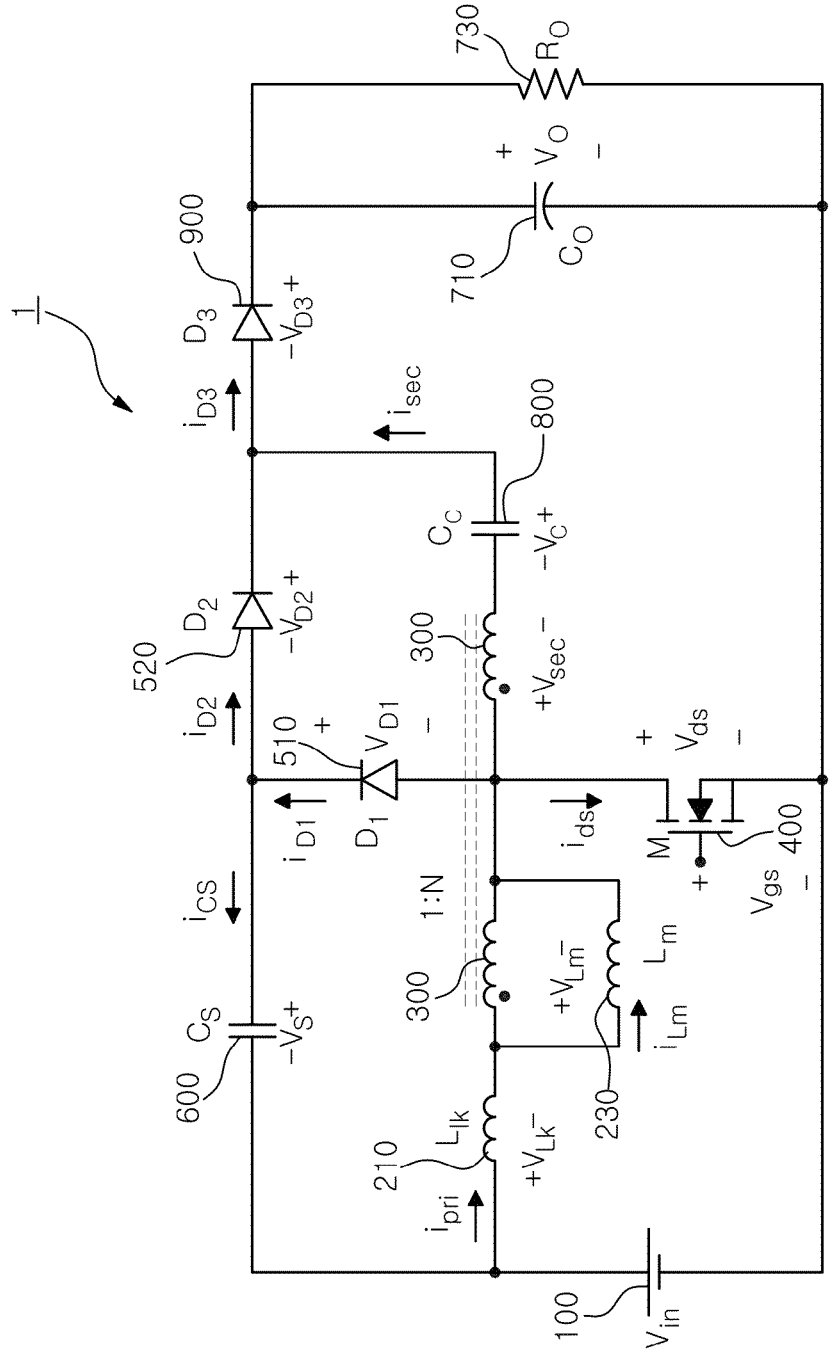
FIG. 1 is a circuit diagram of a voltage clamp step-up boost converter in accordance with an embodiment of the present invention.

Hereinafter, embodiments of the present invention will be described in detail with reference to the accompanying drawings so that they can be readily implemented by those skilled in the art. However, the present invention may be embodied in different forms, but it is not limited thereto. In drawings, further, portions unrelated to the description of the present invention will be omitted for clarity of the description, and like reference numerals and like components refer to like elements throughout the detailed description.

In the entire specification, when a portion is "connected" to another portion, it means that the portions are not only "connected directly" with each other but they are electrically connected" with each other by way of another device between them. Further, when a portion "comprises" a component, it means that the portion does not exclude another component but further comprises other component unless otherwise described. Furthermore, it should be understood that one or more other features or numerals, steps, operations, components, parts or their combinations can be or are not excluded beforehand.

Hereinafter, the embodiments of the present invention will be described in detail with reference to the accompanying drawings.

Figure 2A:
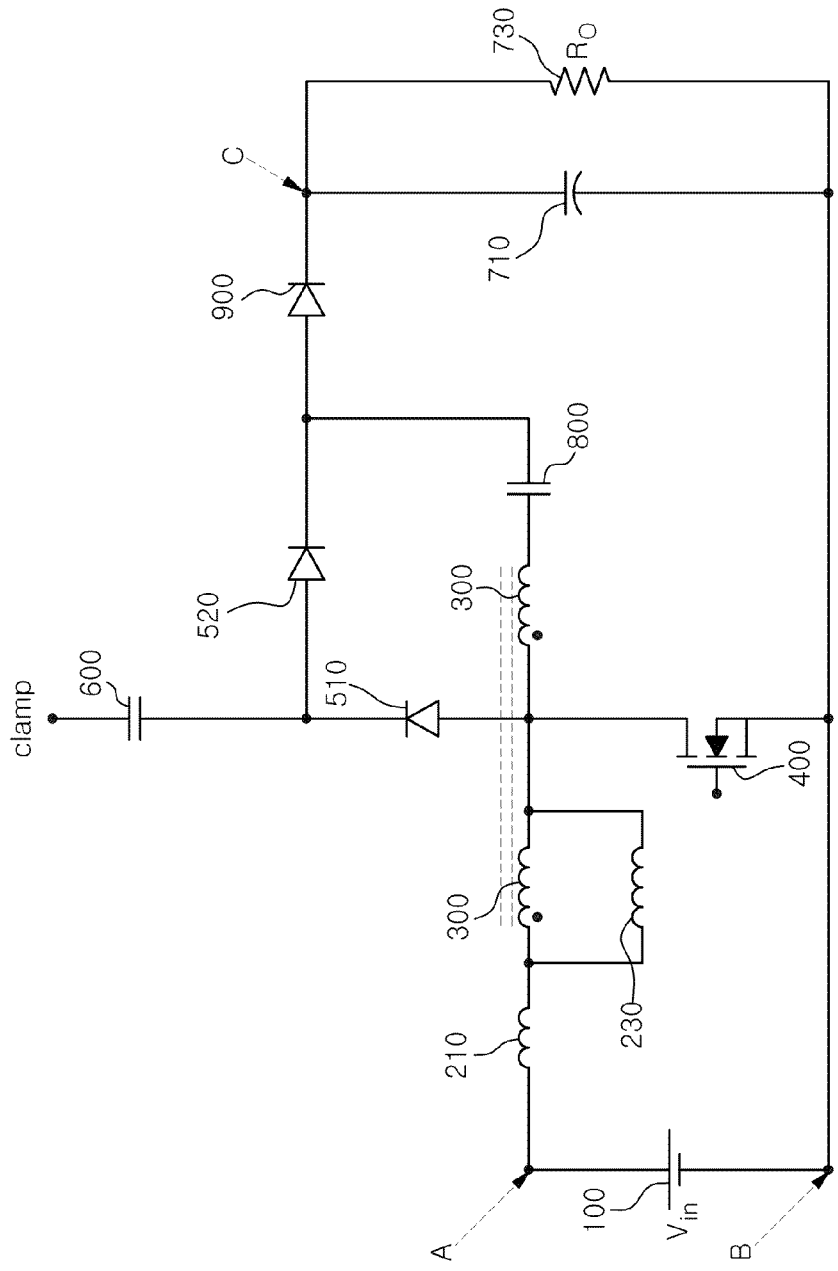
FIGS. 2A to 2C are circuit diagrams illustrating other embodiments of a voltage clamp step-up boost converter shown in FIG. 1.
Figure 2B:
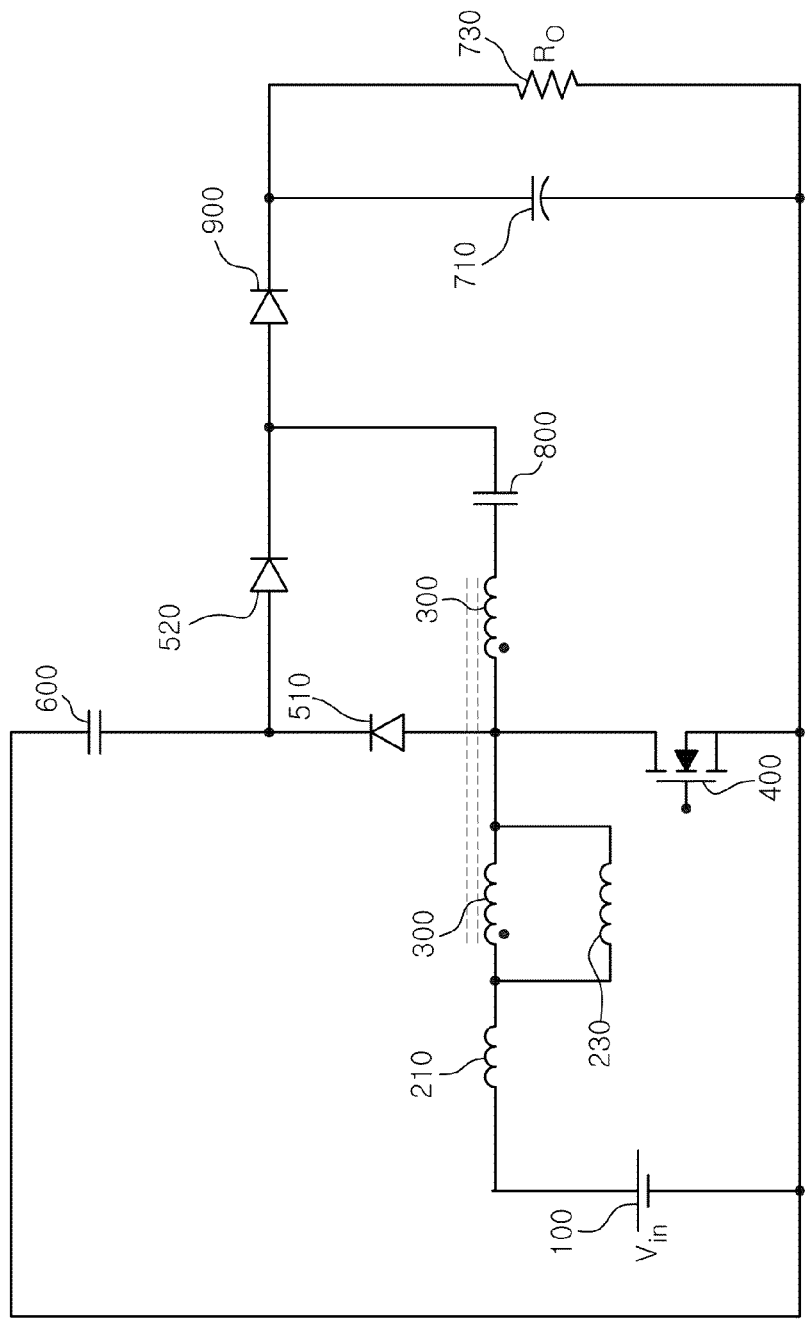
Figure 2C:
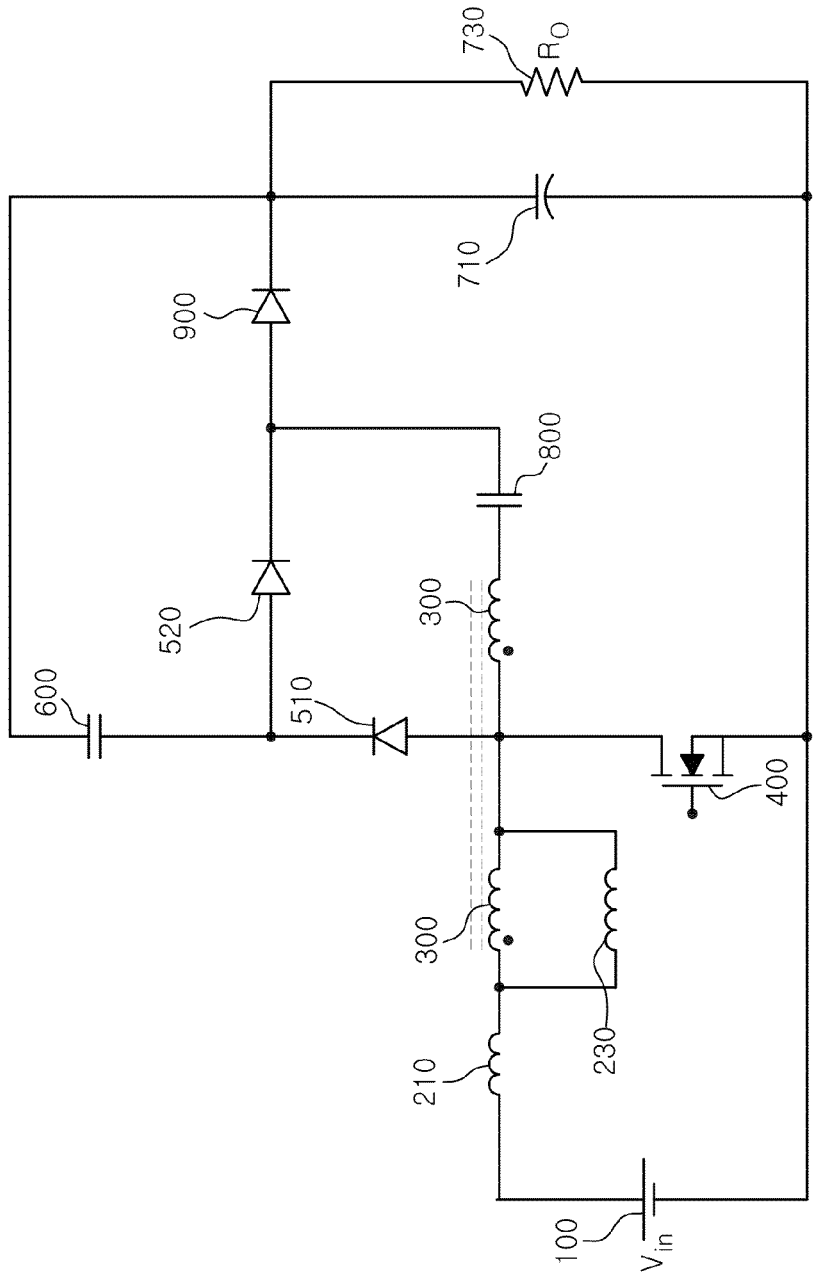

FIG. 1 is a circuit diagram of a voltage clamp step-up boost converter in accordance with an embodiment of the present invention, and FIGS. 2A to 2C are circuit diagrams illustrating other embodiments of the voltage clamp step-up boost converter shown in FIG. 1.

Before describing the embodiment of the present invention, a voltage clamp step-up boost converter 1 shown in FIG. 1 is defined functionally as follows.

The voltage clamp step-up boost converter 1 may include a boost converter, a tapped inductor, a resonant clamp capacitor, a blocking capacitor, and an output load resistor. Herein, reference numerals would not be assigned to the respective components of the voltage clamp step-up boost converter 1 because of a mere functional definition of them.

The boost converter serves to store current applied from a power supply unit in at least one inductor, add energy stored in the at least one inductor to the energy of the power supply voltage to deliver the added energy to an output end in accordance with on/off operations of a switch, and then output a boosted voltage through the output end.

The tapped inductor outputs an increased voltage based on a conversion factor, and the blocking capacitor is charged with the voltage in accordance with the on/off operations of the switch. In addition, the boosted voltage is applied to the output load resistor in accordance with the outputs from the boost converter, the tapped inductor, and the blocking capacitor. In the aforementioned configuration, the output load resistor may be incorporated into the boost converter, however, for the sake of convenience of explanation, the description thereof will be made separately.

Accordingly, the voltage clamp step-up boost converter 1 of the embodiment may have a high boost ratio by totaling all of the boost ratio of the boost converter itself, the boost ratio based on the turn ratio of the tapped inductor and the voltage charged in the blocking capacitor.

Hereinafter, the connection of the components in the voltage clamp step-up boost converter will be described in detail.

Referring to FIG. 1, the voltage clamp step-up boost converter 1 may include a power supply unit 100, a leakage inductor 210, a magnetizing inductor 230, a tapped inductor 300, a switch 400, a first diode 510, a second diode 520, a resonant clamp capacitor 600, an output capacitor 710, an output load resistor 730, a DC blocking capacitor 800, and an output diode 900.

The leakage inductor 210 has a first end connected to the power supply unit 100 and a second end connected to the tapped inductor 300 and the magnetizing inductor 230. The magnetizing inductor 230 has a first end connected to a second end of the leakage inductor 210 and a second end connected to a second end of the tapped inductor 300.

The tapped inductor 300 has a first end connected to the second end of the leakage inductor 210, a second end connected to a first end of the switch 400, and a third end connected to a first end of the blocking capacitor 800. The tapped inductor 300 may have a conversion factor of 1:N, where the first end of the tapped inductor becomes the primary side and the third end thereof becomes the secondary side. Like a transformer, the input-to-output conversion ratio of the tapped inductor 300 may be determined based on a coupling coefficient.

The switch 400 has the first end connected to the second end of the tapped inductor 300 and a second end connected to the second end of the power supply unit 100. The switch 400 may be, for example, any one of a BJT (Bipolar Junction Transistor), a JFET (Junction Field-Effect Transistor), a MOSFET (Metal-Oxide Semiconductor Field-Effect Transistor), and a GaAs MESFET (Metal Semiconductor FET).

The first diode 510 has a first end that is connected to the second end of the tapped inductor 300 and a second end that is connected to a second end of the resonant clamp capacitor 600 and a first end of the second diode 520. Further, the second diode 520 has the first end connected to the second end of the first diode 510 and a second end connected to the third end of the tapped inductor 300.

The resonant clamp capacitor 600 has a second end connected between the second end of the first diode 510 and the first end of the second diode 520. The resonant clamp capacitor 600 may be interposed for the voltage clamping across the switch 400 and the zero-voltage switching when the switch 400 is turned off. In this case, the first end of the resonant clamp capacitor 600 may be connected to a node to ensure that a constant voltage level is maintained. That is, the first end of the resonant clamp capacitor 600 is used as a clamp node, which may be connected to any node at which the constant voltage level is maintained. This will be explained with reference to FIGS. 2A to 2C.

Referring now to FIG. 2A, a resonant clamp capacitor 600 has a second end that is fixed between a first diode 510 and a second diode 520. The resonant clamp capacitor 600 also has a first end that is freely connected to any one of points A, B, and C. The embodiment shown in FIG. 1 is defined as a case where the first end of the resonant clamp capacitor 600 is connected to a point A; an embodiment shown in FIG. 2A is defined as a case where the first end of the resonant clamp capacitor 600 is connected to a point B; and an embodiment shown in FIG. 2C is defined as a case where the first end of the resonant clamp capacitor 600 is connected to a point C.

When the first end of the resonant clamp capacitor 600 is connected to the point A, the arrangement corresponds to that illustrated in FIG. 1. In this case, the first end of the resonant clamp capacitor 600 is connected between the first end of the power supply unit 100 and the first end of the leakage inductor 210. When the first end of the resonant clamp capacitor 600 is connected to the point B, the arrangement corresponds to that illustrated in FIG. 2B. In this case, the first end of a resonant clamp capacitor 600 is connected between the second end of a power supply unit 100 and the second end of a switch 400. When the first end of the resonant clamp capacitor 600 is connected to the point C, the arrangement corresponds to that illustrated in FIG. 2C. In this case, the first end of the resonant clamp capacitor 600 is connected between the second end of an output diode 900 and the first end of an output capacitor 710.

The overall operations of the voltage clamp step-up boost converters illustrated in FIGS. 2A to 2C are substantially same one other, except the difference in the offset voltages applied to the resonant clamp capacitor 600. Specifically, the offset voltage applied to the resonant clamp capacitor 600 of FIG. 2A may be lower than that of the resonant clamp capacitor 600 of FIGS. 2B and 2C. Therefore, the voltage clamp step-up boost converter 1 of the embodiment illustrated in FIG. 2A may exhibit the lowest withstand voltage property.

Referring back to FIG. 1, the output capacitor 710 has a first end connected to the second end of the second diode 520 and a second end connected to the second end of the switch 400. In addition, the output load resistor 730 has a first end connected to the first end of the output capacitor 710 and a second end connected to the second end of the output capacitor 710.

The DC blocking capacitor 800 has a first end connected to the third end of the tapped inductor 300 and a second end connected to the second end of the second diode 520. The output diode 900 has a first end connected to the second ends of the blocking capacitor 800 and the second diode 520 and a second end connected to the first end of the output capacitor 710.

Figure 3A:
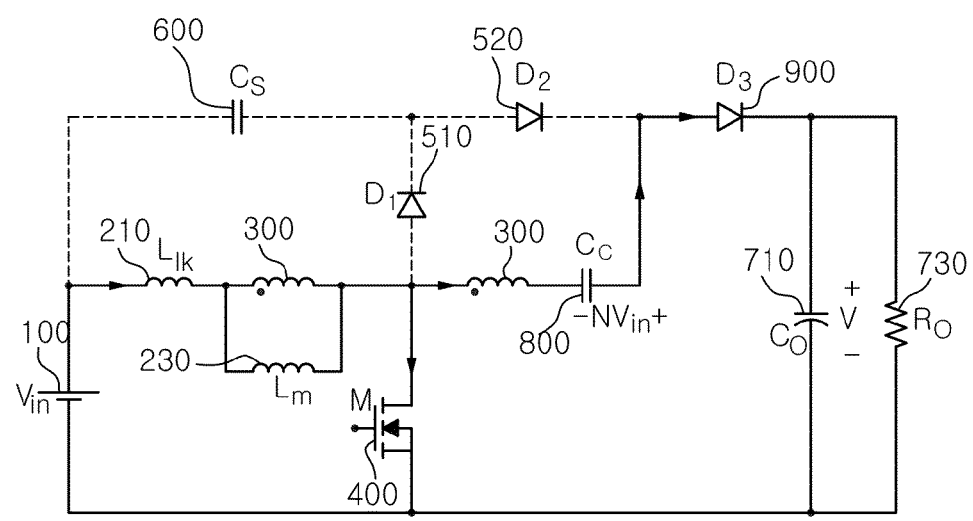
FIGS. 3A to 3N are circuit diagrams and timing diagrams of waveforms explaining the operation of the voltage clamp step-up boost converter shown in FIG. 1.
Figure 3B:
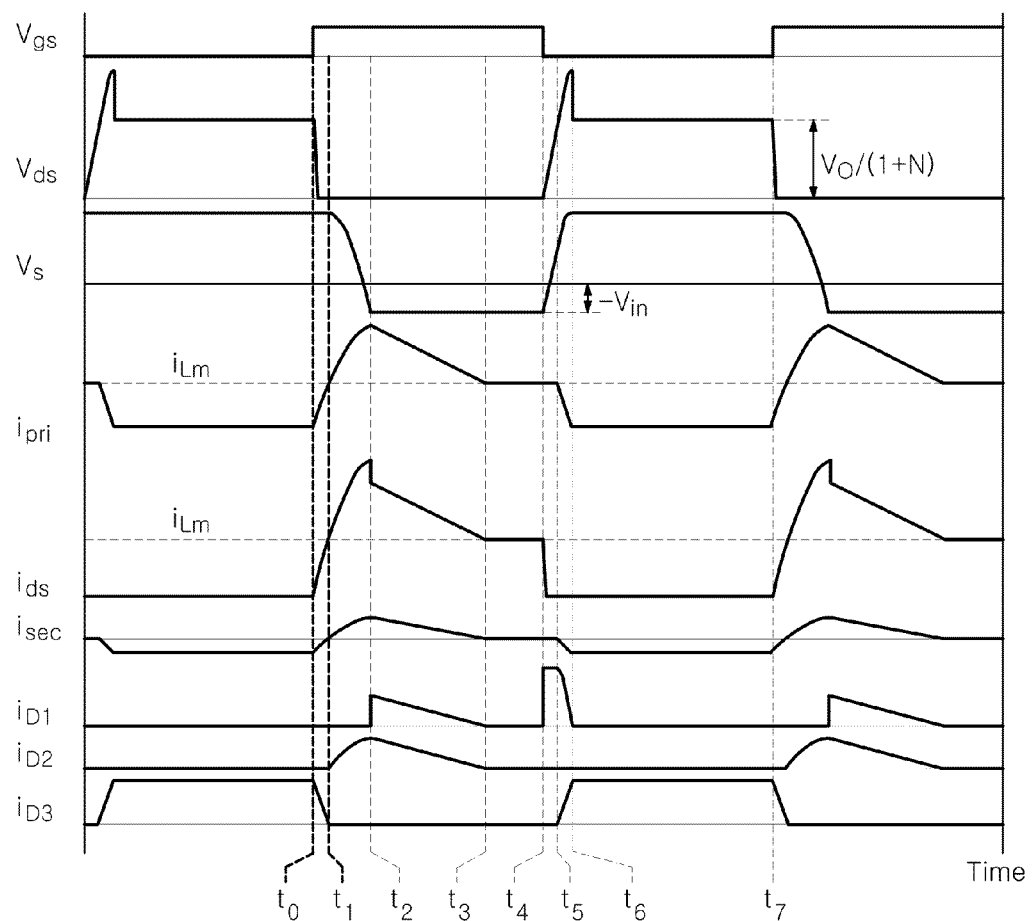
Figure 3C:
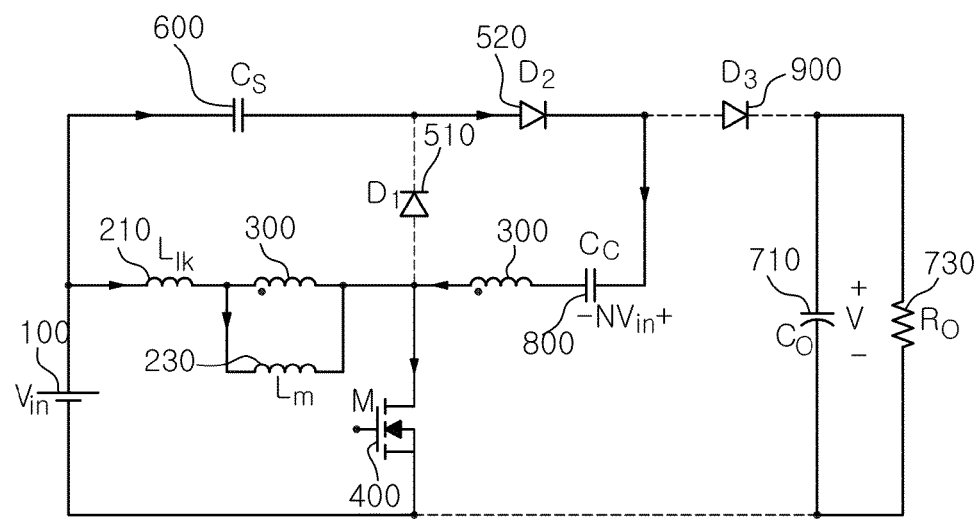
Figure 3D:
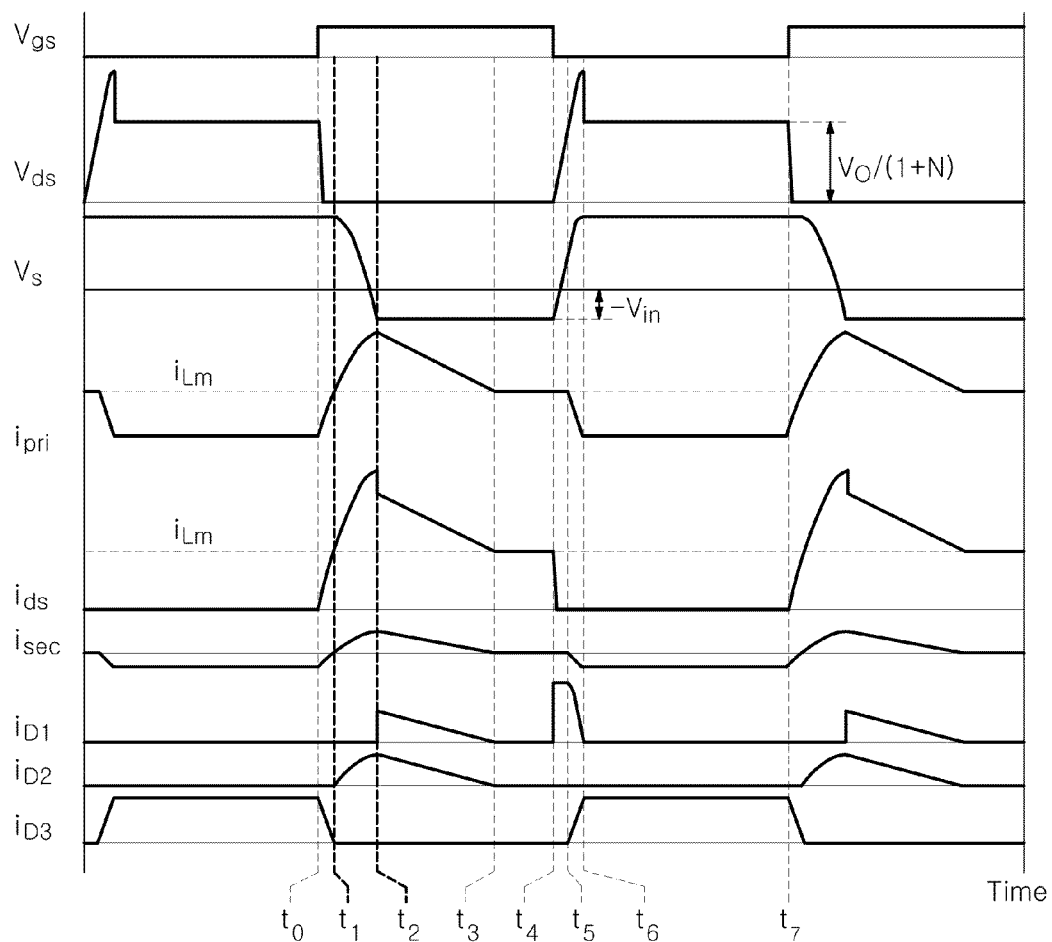
Figure 3E:
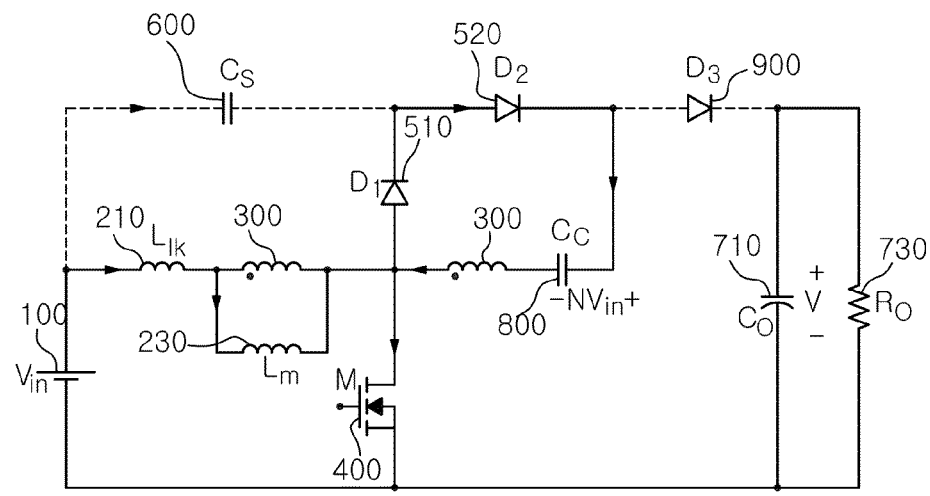
Figure 3F:
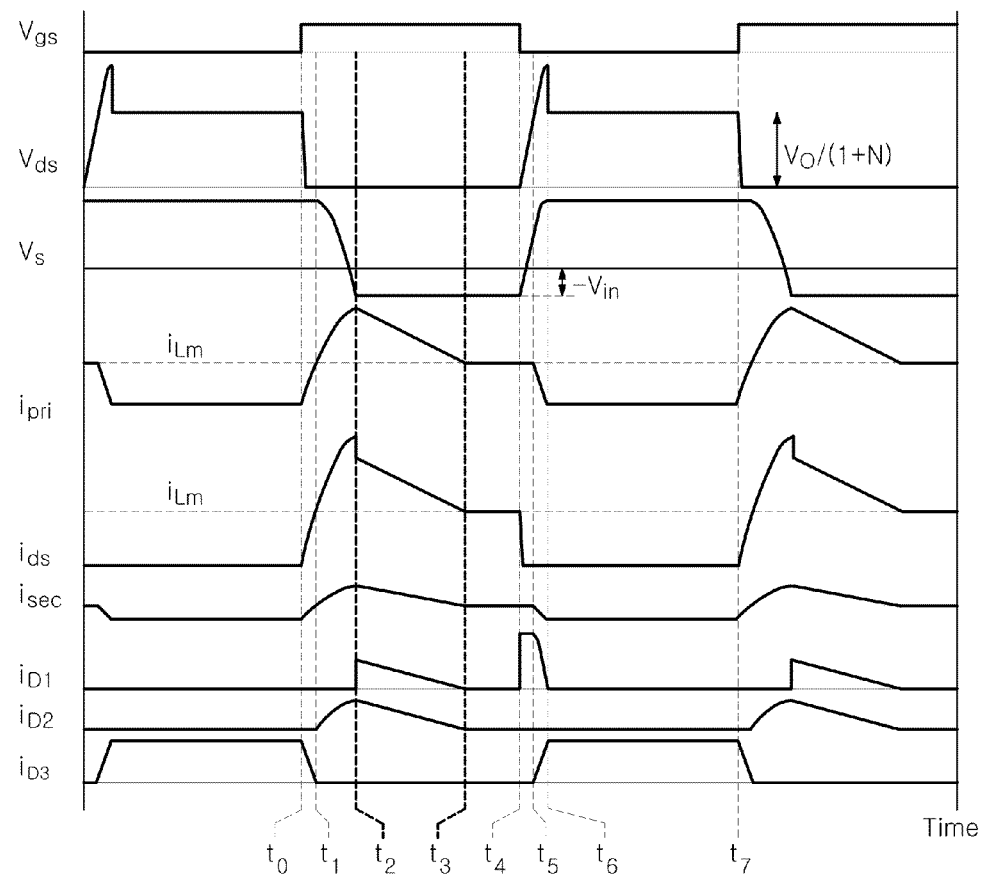
Figure 3G:
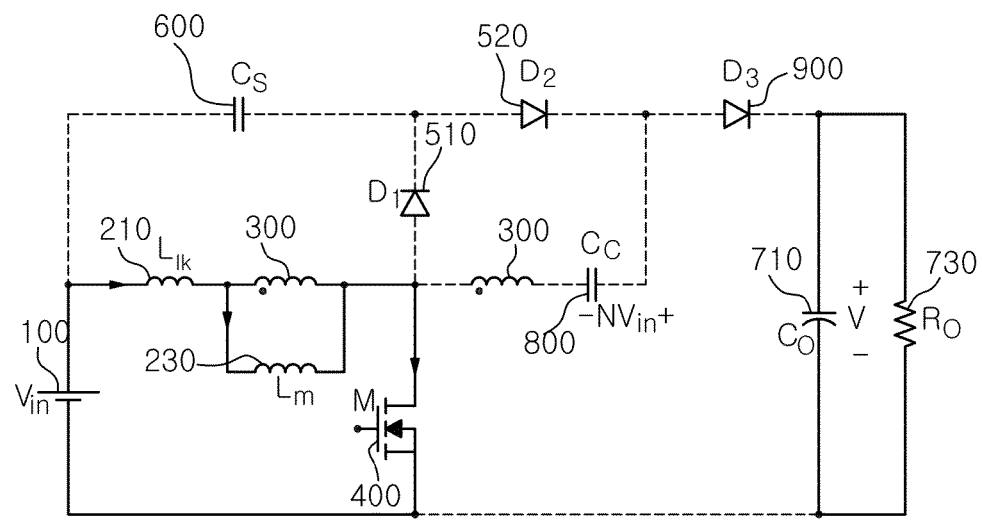
Figure 3H:
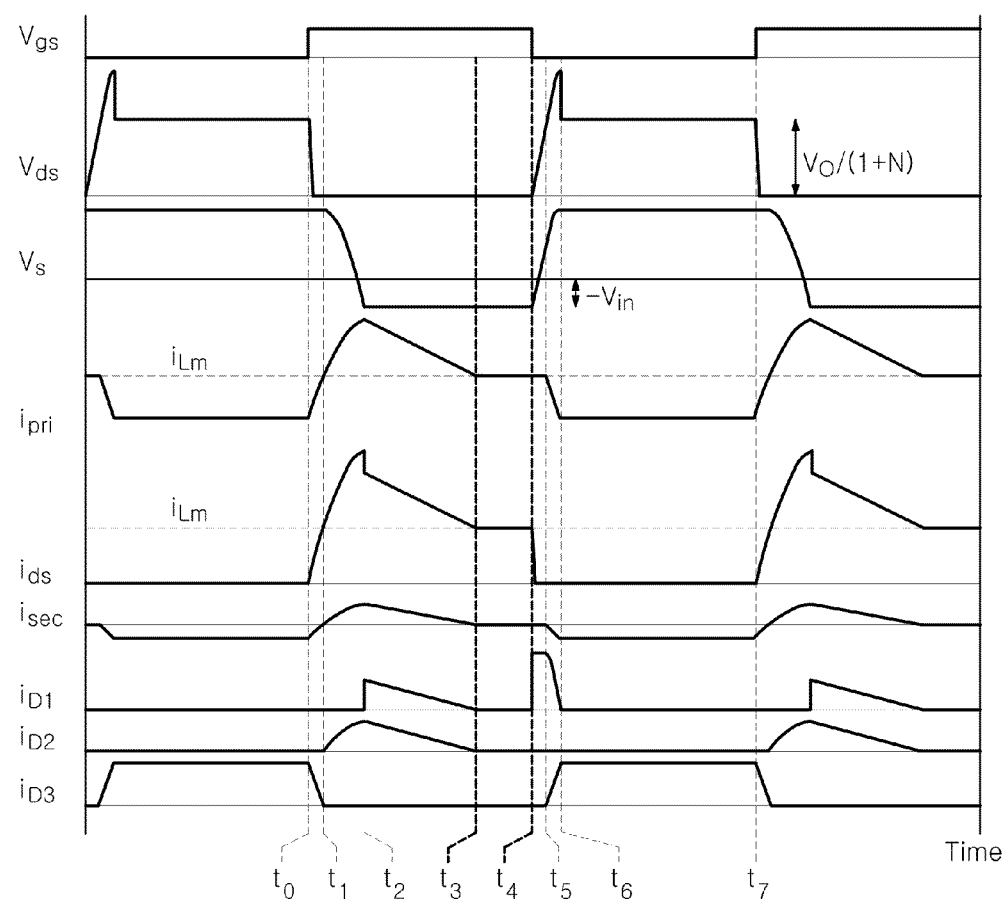
Figure 31:
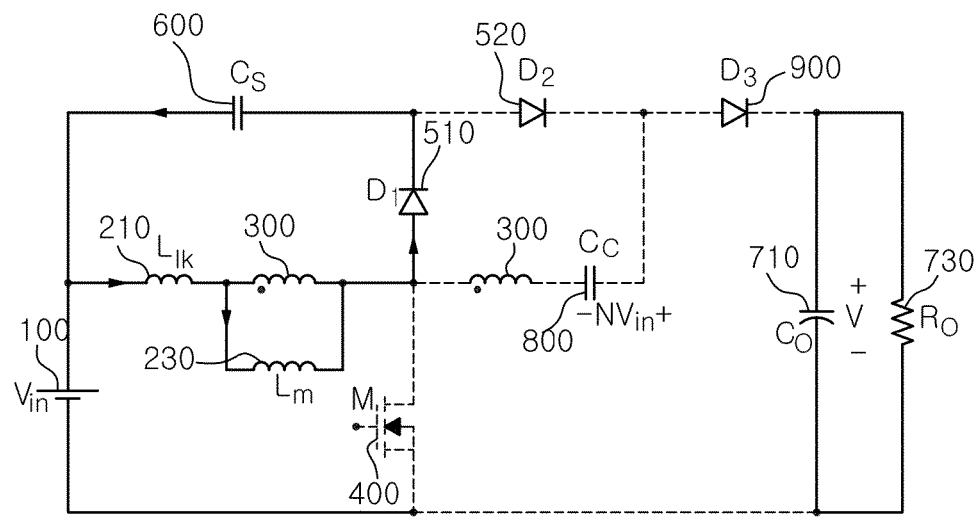
Figure 3J:
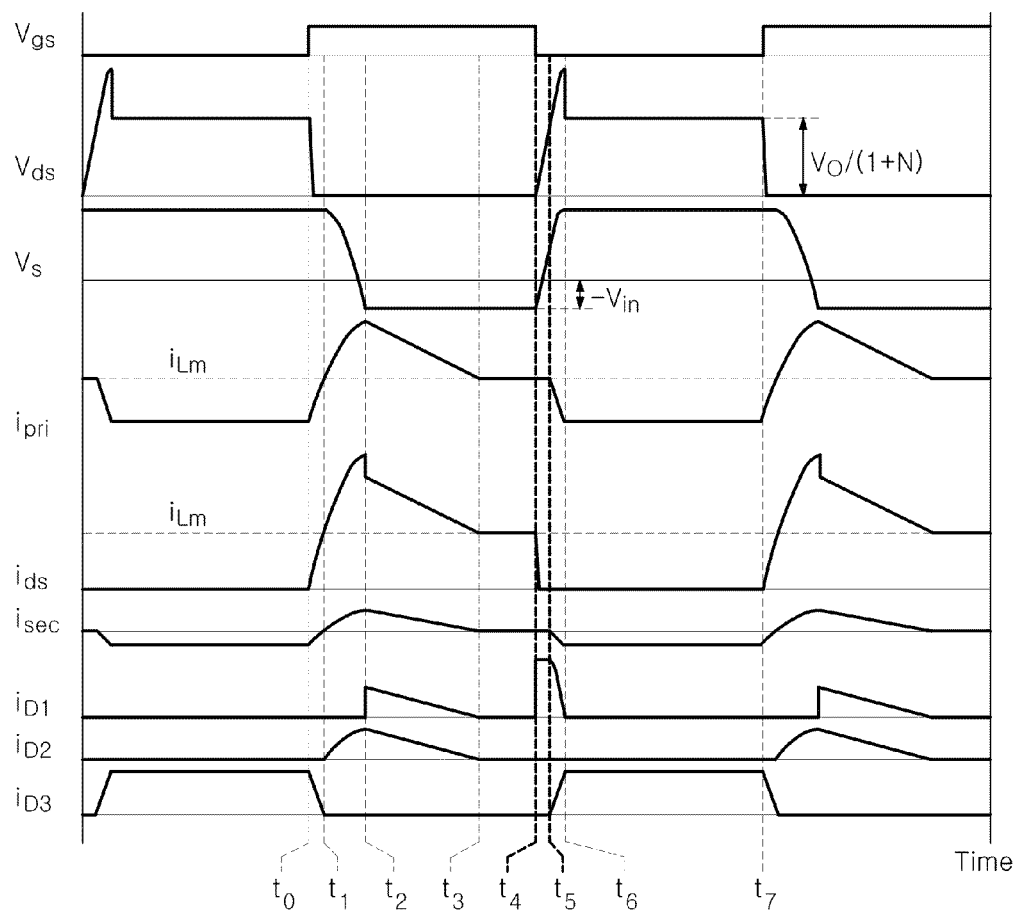
Figure 3K:
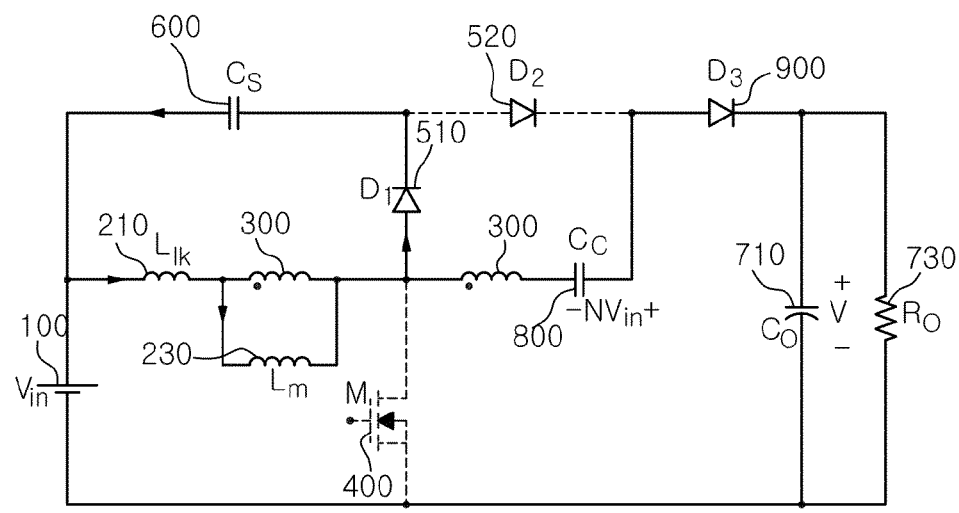
Figure 3L:
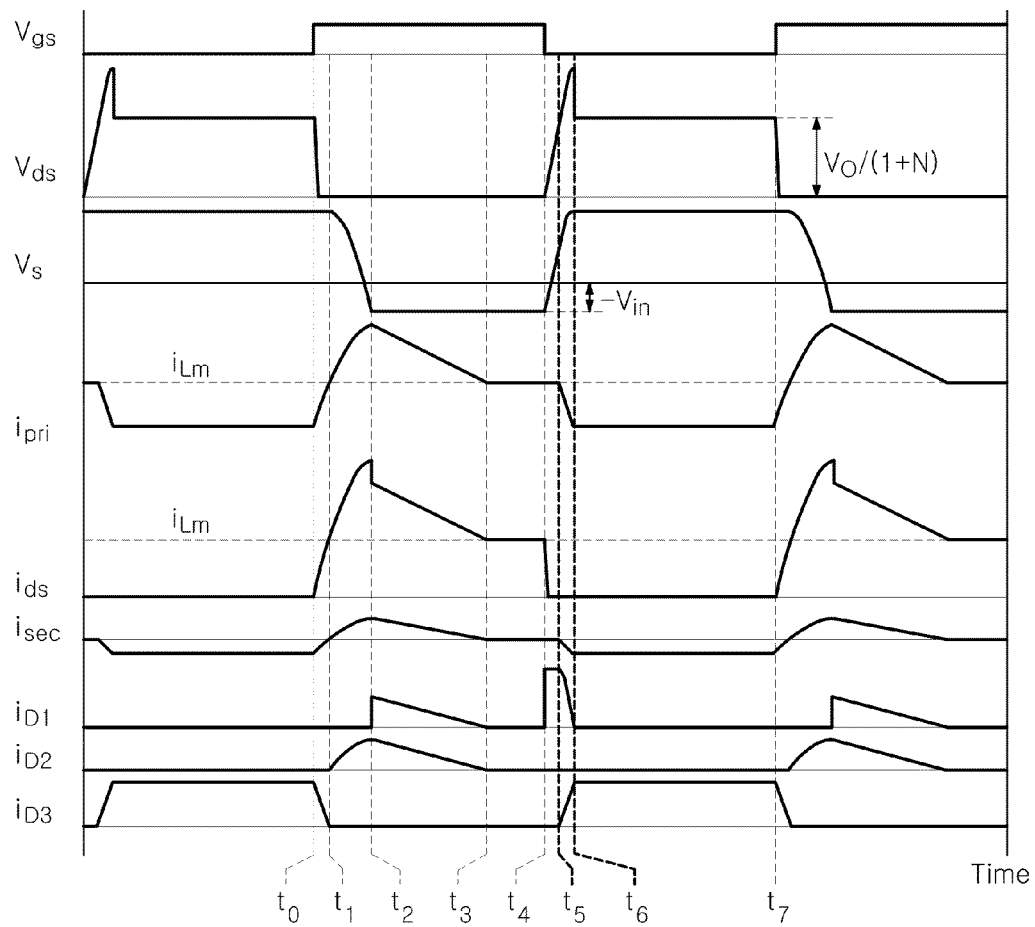
Figure 3M:
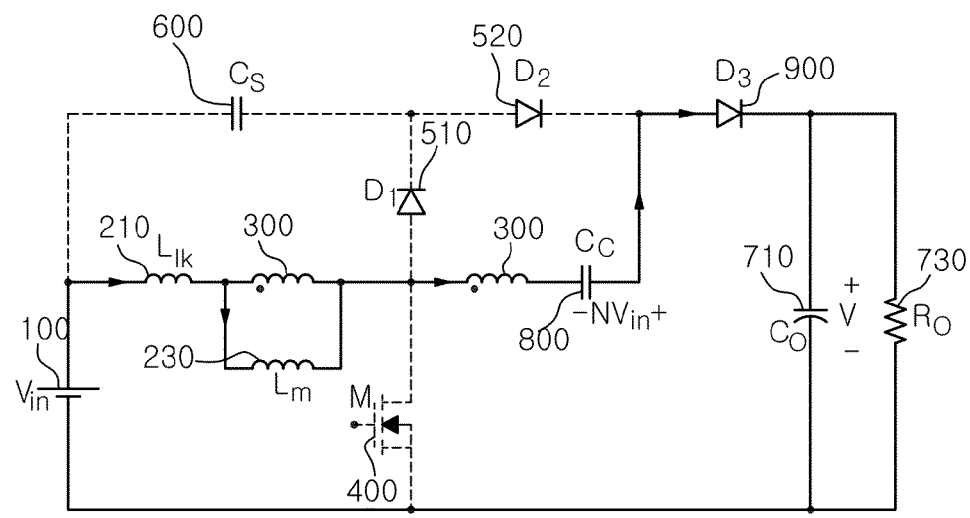
Figure 3N:
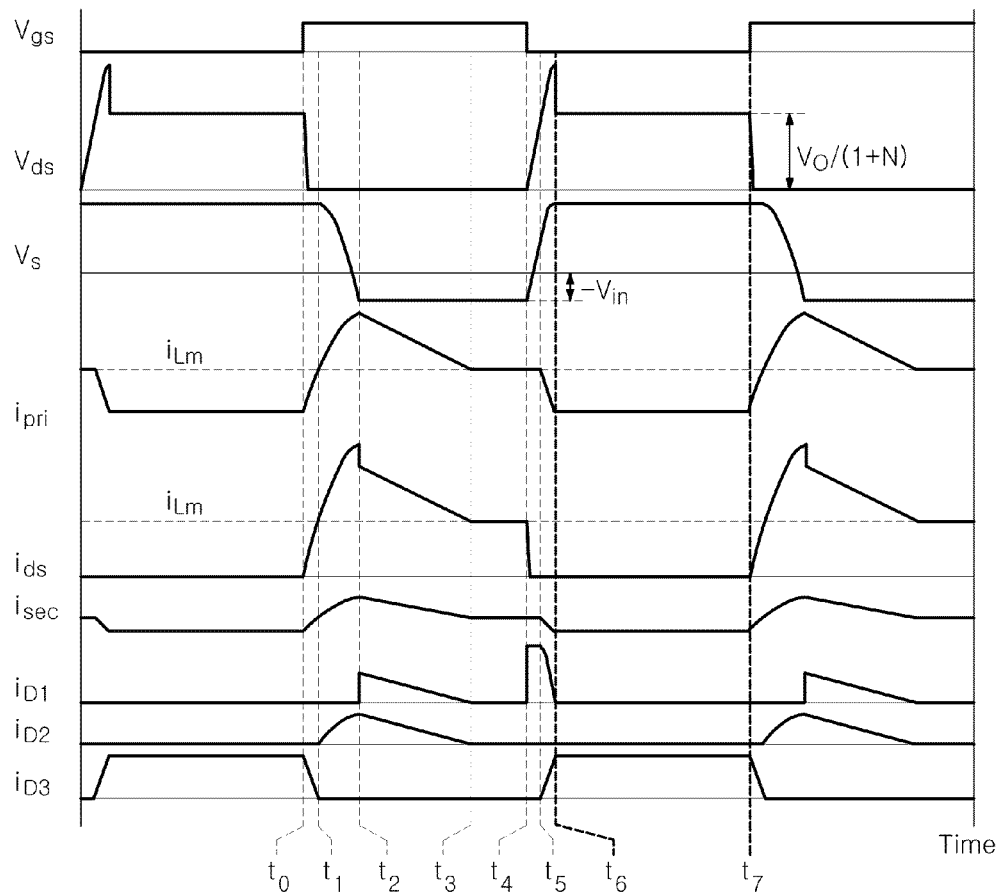

FIGS. 3A to 3N illustrate circuit diagrams and timing diagrams of waveforms explaining the operation of the voltage clamp step-up boost converter shown in FIG. 1. Hereinafter, the operation of the voltage clamp step-up boost converter 1 having the foregoing configuration will be explained in detail with reference to FIG. 1 and FIGS. 3A to 3N.

Before explaining the operation, it is assumed for the convenience of the interpretation of the operation modes as follows:
i) the magnetizing inductor 230 has inductance as large as to ignore a current ripple caused by the magnetizing inductor 230; ii) the components of the voltage clamp step-up boost converter 1 of the embodiments are ideal; iii) the output capacitor 710 has capacitance as large as to ignore the voltage ripple of an output voltage Vo; iv) the blocking capacitor 800 has capacitance as large as to ignore the voltage ripple of a voltage $V_C$ applied to the blocking capacitor 800; and V) all operations are in steady-states.

Hereinafter, two terms in pairs will be designated as the same component such as the power supply unit 100 and $V_{in}$; the leakage inductor 210 and $L_{Lk}$; the magnetizing inductor 230 and $L_m$; the switch 400 and M; the first diode 510 and $D_1$; the second diode 520 and $D_2$; the resonant clamp capacitor 600 and Cs; the output capacitor 710 and Co; the output load resistor 730 and $R_O$; the blocking capacitor 800 and Cc; and the output diode 900 and $D_3$.

Moreover, $i_{pri}$ means the primary side current of the tapped inductor 300; $V_{LK}$ means the voltage applied to the leakage inductor 210; $V_{Lm}$ means the voltage applied to the magnetizing inductor 230; $i_{ds}$ means current flowing to a drain and source of the switch 400; $V_{sec}$ means the secondary side voltage of the tapped inductor 300; $V_C$ means the voltage applied to the blocking capacitor 800; $i_{sec}$ means the secondary side current of the tapped inductor 300 (the waveform of $i_{sec}$ will be represented in an inverted form throughout FIGS. 3A to 3N for the sake of convenience); $V_{D1}$ the voltage applied to the first diode 510; $i_{D1}$ means the current flowing to the first diode 510; $V_S$ means the voltage applied to the resonant clamp capacitor 600; $i_{CS}$ means the current flowing to the resonant clamp capacitor 600; $V_{D2}$ means the voltage applied to the second diode 520; $i_{D2}$ means the current flowing to the second diode 520; $V_{D3}$ means the voltage applied to the output diode 900; and $i_{D3}$ means the current flowing to the output diode 900.

FIG. 3A represents a conductive path in accordance with the operation of the voltage clamp step-up boost converter at t0~t1. Referring to FIG. 3B, the switch 400 is in a turned-off state prior to t0, and the energy stored in the magnetizing inductor 230 is passed to the output end through the output diode 900. At t0~t1, the switch 400 become a turned-on state, a conductive path of the voltage clamp step-up boost converter is illustrated as in FIG. 3A.

As illustrated in the FIG. 3B, the voltage $V_{ds}$ across the switch 400 rapidly decreases from $V_o/(1+N)$ to 0V and at the same time the primary side current $i_{pri}$ of the tapped inductor 300 increases and the secondary side current $i_{sec}$ decreases (in view of its inverted waveform). Specifically, the secondary side current $i_{sec}$ slowly decreases to 0 A by the leakage inductor 210 (in view of its inverted waveform) and the magnetizing inductor 230 and the primary side current $i_{pri}$ slowly increases.

Therefore, because the current $i_{pri}$-$i_{sec}$ which flows through the switch 400 gradually increases, when the switch 400 is turned on, the voltage $V_{ds}$ and the current $i_{ds}$ have a phase reversal relation enough not to overlap with each other in their waveforms, thereby reducing the switching loss.

FIG. 3C represents a conductive path in accordance with the operation of the voltage clamp step-up boost converter at t1~t2. Referring to FIG. 3D, the operation of the voltage clamp step-up boost converter at t1~t2 is started when the primary side current $i_{pri}$ gradually increases to become equal to the current $i_{Lm}$ of the magnetizing inductor 230 and the secondary side current $i_{sec}$ of the magnetizing inductor 230 becomes equal to 0 A. At this time, the output diode 900 is turned off and the second diode 520 is turned on, thereby forming the conductive path illustrated in FIG. 3C. Accordingly, the voltage applied to the blocking capacitor 800 becomes to reduce to $-V_{in}$ due to the resonance of the resonant clamp capacitor 600 and the leakage inductor 210.

FIG. 3E represents a conductive path in accordance with the operation of the voltage clamp step-up boost converter at t2~t3. Referring to FIG. 3F, the operation of the voltage clamp step-up boost converter at t2~t3 is started when the voltage applied to the resonant clamp capacitor 600 reaches $-V_{in}$. At this time, the first diode 510 is conducted, thereby forming the conductive path illustrated in FIG. 3E. In this case, because the switch 400 is in a turned-on state, the input voltage $V_{in}$ is applied to both of the leakage inductor 210 and the magnetizing inductor 230. Accordingly, energy is stored in the magnetizing inductor 230 and simultaneously, $NV_{in}$ is charged in the blocking capacitor 800 with the turn ratio of the tapped inductor 300.

FIG. 3G represents a conductive path in accordance with the operation of the voltage clamp step-up boost converter at t3~t4. Referring to FIG. 3H, when the blocking capacitor 800 is fully charged, the first diode 510 and the second diode 520 are turned off as illustrated in FIG. 3G. Since the switch 400 is still turned on, the input voltage $V_{in}$ is applied to the leakage inductor 210 and the magnetizing inductor 230 as similar to FIG. 3C and thus energy is stored in the magnetizing inductor 230.

FIG. 3I represents a conductive path in accordance with the operation of the voltage clamp step-up boost converter at t4~t5. Referring to FIG. 3I, when the switch 400 is turned off, the conductive path is formed as illustrated in FIG. 3I and the current $i_{Lm}$ of the switch 400 is rapidly reduced to 0 A as illustrated in FIG. 3J. At the same time, the energy stored in the leakage inductor 210 and the magnetizing inductor 230 is charged in the resonant clamp capacitor 600 through the first diode 510. Therefore, the voltage applied to the resonant clamp capacitor 600 begins to gradually increase from $-V_{in}$. Further, the voltage across the switch 400, which is represented as $V_{in}+V_{CS}$, gradually begins to increase from 0V. Accordingly, when the switch 400 is turned-off, the voltage $V_{ds}$ and the current $i_{ds}$ have a phase reversal relationship enough not to overlap with each other in their waveforms, whereby it is possible to reduce the switching loss.

FIG. 3K represents a conductive path in accordance with the operation of the voltage clamp step-up boost converter at t5~t6. Referring to FIG. 3L, when the voltage $V_{ds}$ across the switch 400 reaches $V_O/(1+N)$, the output diode 900 is conducted and the resonant clamp capacitor 600 and the leakage inductor 210 cause resonance together. Therefore, the voltage $V_S$ of the resonant clamp capacitor 600 and the voltage $V_{ds}$ of the switch 400 increase as illustrated in Fig. L, and the current in of the first diode 510 becomes 0 after ¼ resonance cycle. Simultaneously, when the secondary side current $i_{sec}$ reaches $i_{Lm}/(N+1)$, the operation at the t5~t6 is finished.

FIG. 3M represents a conductive path in accordance with the operation of the voltage clamp step-up boost converter at t6~t7. Referring to FIG. 3N, when the secondary side current $i_{sec}$ reaches the $i_{Lm}/(N+1)$, the conductive path is formed as illustrated in FIG. 3M and the energy stored in the leakage inductor 210 and the magnetizing inductor 230 is passed to the output end. Thereafter, when the switch 400 is again turned on, the operation at t6~t7 is finished.

The voltage relational expressions are derived in accordance with the aforementioned operations as follows.

First, let the operations at t0~t2 and t4~t6 be ignored for the convenience of deriving the voltage relational expressions related to the respective components off the voltage clamp step-up boost converter in accordance with the embodiment of the present invention.

The voltage $V_C$ is applied to the secondary side of the tapped inductor 300 for the duration $DT_S$ where the switch 400 is in a turned-on state whereas the voltage $-(V_o-V_c-V_{in})N/(N+1)$ is applied to the secondary side of the tapped inductor 300 for the duration $(1-D)T_S$ where the switch 400 is in a turned-off state. Therefore, the following Equation can be derived by applying a voltage-time balanced condition to the secondary side of the tapped inductor 300.

[EQUATION 1]

$$DT_S V_C = (1-D)T_S \frac{N}{N+1}(V_O - V_C - V_{in})$$

By rearranging the Equation 1, $V_C$ can be expressed as the following Equation 2.

[EQUATION 2]

$$V_C = NV_{in}$$

In the meantime, the voltage $V_{in}$ is applied to an voltage $V_{LM}$ of the primary side of the magnetizing inductor 230 for the duration $DT_S$ where the switch 400 is in a turned-on state whereas the voltage $-(V_o-V_{in}-V_C)/(1+N)$ is applied to the voltage $V_{LM}$ of the primary side of the magnetizing inductor 230 for the duration $(1-D)T_S$ where the switch 400 is in a turned-off state. Therefore, the following Equation can be derived by applying voltage-time balanced condition to the primary side of the tapped inductor 300.

[EQUATION 3]

$$DT_S V_{in} = (1-D)T_S(V_O - V_{in} - V_C)/(1+N)$$

By substituting the Equation 3 with the Equation 2, the following Equation 4 can be derived.

[EQUATION 4]

$$V_O = \frac{N+1}{1-D}V_{in}$$

where $V_o$ represents an output voltage, $V_{in}$ represents an input voltage, N represents the conversion factor (or, turn ratio) of the tapped inductor, and D represents a duty ratio.

Figure 4A:
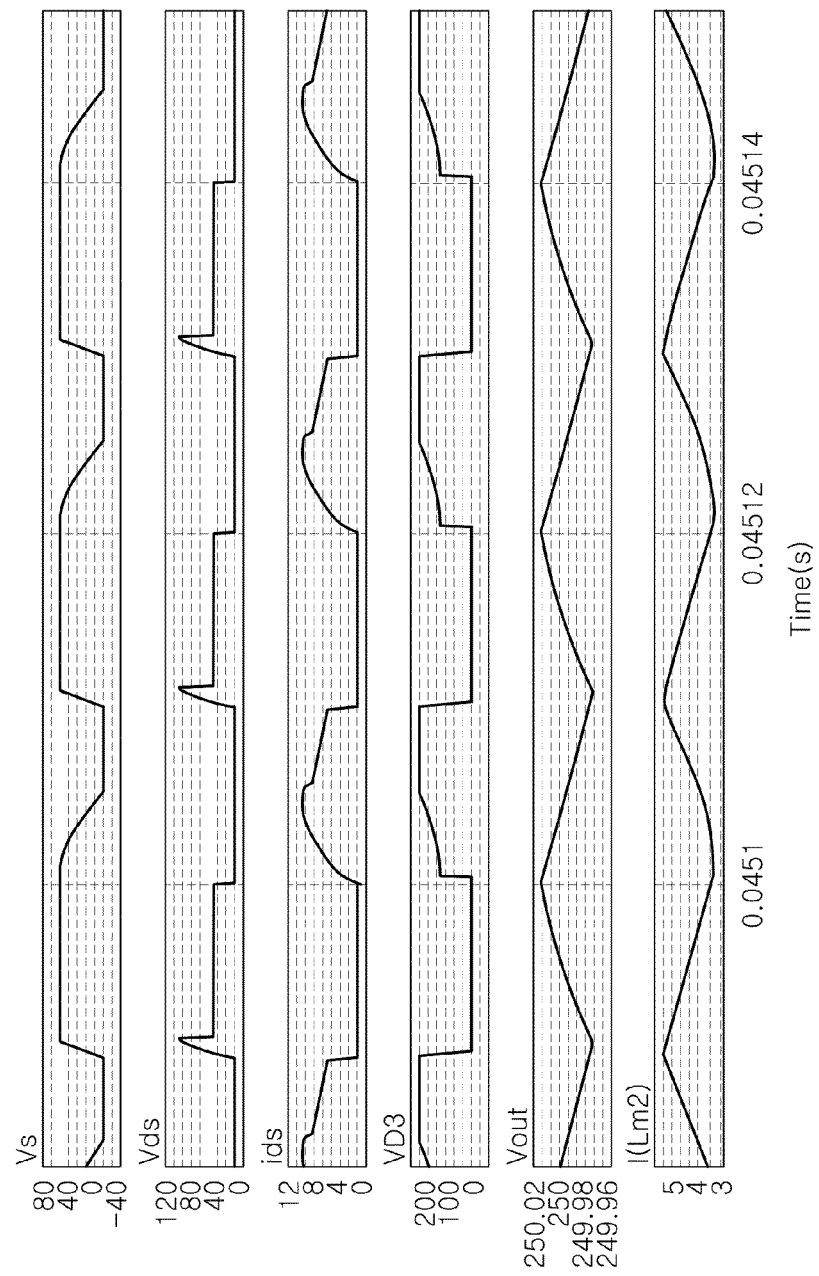
FIGS. 4A and 4B illustrates experimental waveforms of the voltage clamp step-up boost converter of FIG. 1 and a prior art for the comparison between them.
Figure 4B:
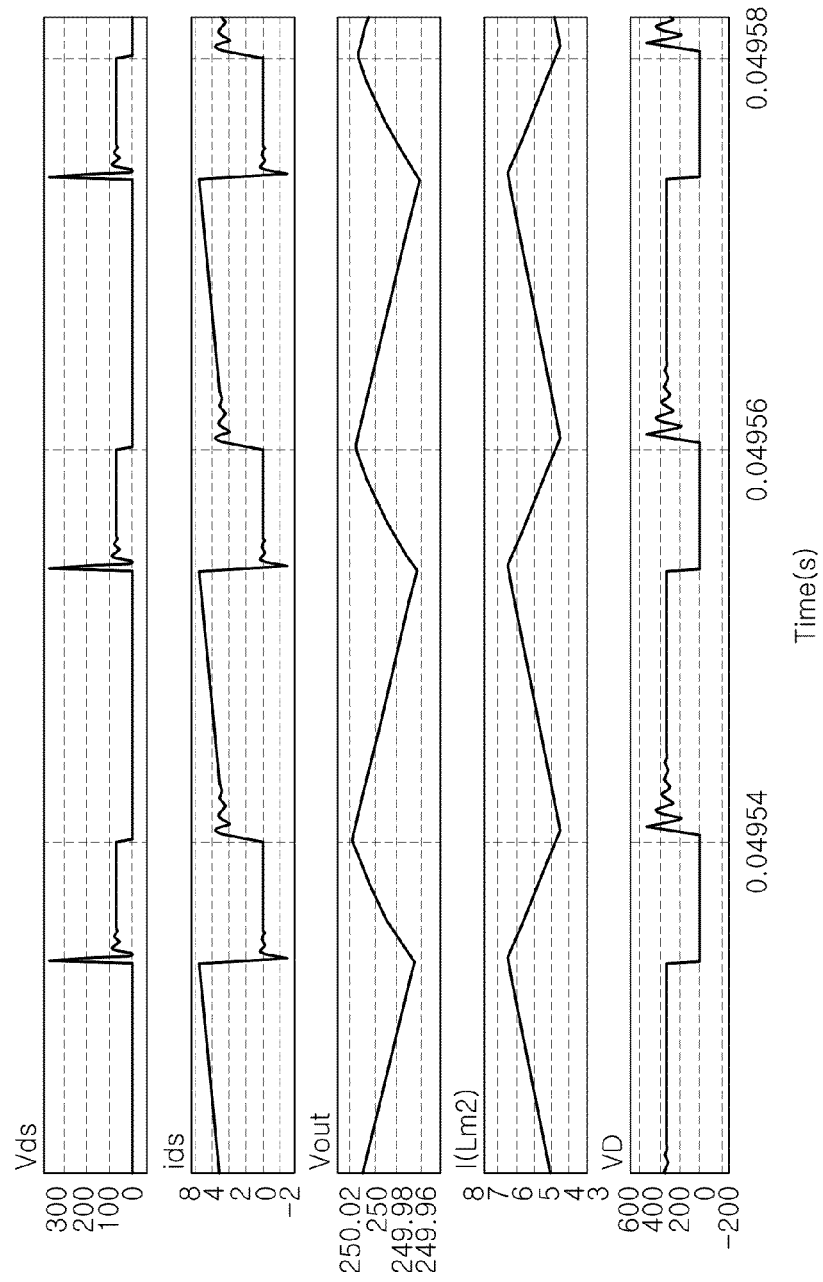

FIGS. 4A and 4B shows experimental waveforms of the voltage clamp step-up boost converter of FIG. 1 and a prior art for the comparison between them. Specifically, FIG. 4A shows an experimental result on the voltage clamp step-up boost converter of the present invention using a simulation tool.

The specification used in the simulation is as follows: the input voltage is 24V; the output voltage and electricity are 250V and 100 W, respectively; the inductance of the leakage inductor 210 is 10 μl; the inductance of the magnetizing inductor 230 is 100 μH; the turn ratio of the inductors is 1:4; and the capacitance of the resonant clamp capacitor 600 is 47 nF.

Referring to FIG. 4A, it can be known that regardless of the resonance caused by the inductor component of the tapped inductor and the parasitic capacitor, the voltage of each component is clamped by the input and output voltages. Further, the current of the switch 400 increases with a slow inclination when the switch 400 is turned on. Therefore, the waveforms of the voltage $V_{ds}$ across the switch 400 and the current $i_{ds}$ of the switch 400 are not overlap with each other. Meanwhile, the voltage of the switch 400 also increases with a slow inclination when the switch 400 is turned off. Therefore, the waveforms of the voltage $V_{ds}$ across the switch 400 and the current $I_{ds}$ of the switch 400 are also not overlap. Consequently, a very low switching loss is achieved in the actual implementation.

On the other hand, FIG. 4B shows an experimental result on the voltage clamp step-up boost converter of the prior art under the same condition. It can be seen from FIG. 4B that the diode and switch have high voltage stress with the resonance of the inductor component of the transformer and the parasitic capacitor. Particularly, it is observed that the magnitude of current of the magnetizing inductor in the tapped inductor is 7.5 A which is higher than the embodiment of the present invention with respect to the same output load. In addition, the prior art requires the winding number more than usual and a magnetic core having a large air gap and large size in order to prevent the saturation of the tapped inductor.

As set forth above, the voltage clamp step-up boost converter in accordance with the embodiments can be ensured to get the input-to-output boost ratio which is higher than the conventional tapped inductor boost converter by combining all of the turn ratio of the transformer, the voltage of the blocking capacitor, and the boost ratio of the boost converter itself. Especially, the voltage clamp step-up boost converter enables to make the zero current switching by means of the leakage inductance when switch is in a turned-on state and to make the zero-voltage switching by means of the resonant clamp capacitor when the switch is in a turned-off state, thereby significantly reducing the switching loss. Accordingly, the voltage clamp step-up boost converter of the embodiments enables to improve the system efficiency and heat generation.

Description of the present invention as mentioned above is intended for illustrative purposes, and it will be understood to those having ordinary skill in the art that this invention can be easily modified into other specific forms without changing the technical idea and the essential characteristics of the present invention. Accordingly, it should be understood that the embodiments described above are exemplary in all respects and not limited thereto. For example, respective components described to be one body may be implemented separately from one another, and likewise components described separately from one another may be implemented in an integrated type.

The scope of the present invention is represented by the claims described below rather than the foregoing detailed description, and it should be construed that all modifications or changes derived from the meaning and scope of the claims and their equivalent concepts are intended to be fallen within the scope of the present invention.

What is claimed is:

1. A voltage clamp step-up boost converter comprising:
a leakage inductor having a first end connected to a first end of a power supply unit;
a tapped inductor having a first end connected to a second end of the leakage inductor;
a magnetizing inductor having a first end connected to the second end of the leakage inductor and a second end connected to a second end of the tapped inductor;
a switch having a first end connected to the second end of the tapped inductor and a second end connected to a second end of the power supply unit;
a first diode having a first end connected to the second end of the tapped inductor;
a second diode having a first end connected to a second end of the first diode and a second end connected to a third end of the tapped inductor;
a resonant clamp capacitor having a second end connected between the second end of the first diode and the first end of the second diode and a first end connected between the first end of the power supply unit and the first end of the leakage inductor, the resonant clamp capacitor being configured to perform the clamping of the voltage across the switch and zero-voltage switching thereof when the switch is turned-off;
an output capacitor having a first end connected to the second end of the second diode and a second end connected to the second end of the switch;
an output load resistor having a first end connected to the first end of the output capacitor and a second end connected to the second end of the output capacitor; and
a blocking capacitor having a first end connected to the third end of the tapped inductor and a second end connected to the second end of the second diode,
wherein when the switch is turned-on, the voltage clamp step-up boost converter is configured to form a first conductive path through the power supply unit, the resonant clamp capacitor, the blocking capacitor, the tapped inductor, and the switch and cause resonance through the resonant clamp capacitor and the leakage inductor to decrease a voltage applied to the resonant clamp capacitor to a negative (−) voltage, thereby making the switch to be zero-current turned-on; and
wherein when the switch is turned-off, the voltage clamp step-up boost converter is configured to form a second conductive path through the leakage inductor, the tapped inductor, the first diode, and the resonant clamp capacitor to increase the voltage applied to the resonant clamp capacitor to a positive (+) voltage, thereby making the switch to be zero-voltage turned-off.

2. The voltage clamp step-up boost converter of claim 1, further comprising:
an output diode having a first end connected to the second ends of the blocking capacitor and the second diode and a second end connected to the first end of the output capacitor.

3. The voltage clamp step-up boost converter of claim 1, wherein the first end of the resonant clamp capacitor is connected to a node where a constant voltage level is maintained.

4. The voltage clamp step-up boost converter of claim 1, wherein an output voltage applied to the output load resistor is calculated as the following equation:

$$VO=Vin*(N+1)/(1-D)$$

where VO represents the output voltage, Vin represents an input voltage, N represents a conversion turn ratio of the tapped inductor, and D represents a duty ratio.

5. The voltage clamp step-up boost converter of claim 1, wherein the switch comprises any one of a BJT (Bipolar Junction Transistor), a JFET (Junction Field-Effect Transistor), a MOSFET (Metal-Oxide Semiconductor Field-Effect Transistor), and a GaAs MESFET (Metal Semiconductor FET).

6. A voltage clamp step-up boost converter comprising:
a boost converter configured to store current supplied from a power supply unit in at least one inductor and output a boosted voltage that totals a voltage corresponding to the current stored in the at least one inductor and a voltage of the power supply unit in accordance with switching on and off operations of a switch;
a tapped inductor configured to output an increased voltage depending on a conversion factor;
a resonant clamp capacitor configured to charge a voltage in accordance with the switching on and off operations of the switch;
a blocking capacitor connected to the tapped inductor and configured to charge a voltage corresponding to the conversion factor; and
an output load resistor configured to be supplied with the boosted voltage based on the outputs from the boost converter, the tapped inductor and the charged voltage of the blocking capacitor,
wherein when the switch is turned-on, the voltage clamp step-up boost converter is configured to form a first conductive path through the power supply unit, the resonant clamp capacitor, the blocking capacitor, the tapped inductor, and the switch and cause resonance through the resonant clamp capacitor and a leakage inductor to decrease a voltage applied to the resonant clamp capacitor to a negative (−) voltage, thereby making the switch to be zero-current turned-on; and
wherein when the switch is turned-off, the voltage clamp step-up boost converter is configured to form a second conductive path through the leakage inductor, the tapped inductor, the first diode, and the resonant clamp capacitor to increase the voltage applied to the resonant clamp capacitor to a positive (+) voltage, thereby making the switch to be zero-voltage turned-off.

* * * * *